United States Patent
DeLuca et al.

(10) Patent No.: US 10,839,400 B2
(45) Date of Patent: Nov. 17, 2020

(54) NOTIFICATION UPON PRODUCT PURCHASE FOR ASSOCIATED DEADLINES

(71) Applicant: International Business Machines Corporation, Armonk, NY (US)

(72) Inventors: Lisa Seacat DeLuca, Baltimore, MD (US); Dana L. Price, Surf City, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 15/410,098

(22) Filed: Jan. 19, 2017

(65) Prior Publication Data

US 2018/0204218 A1    Jul. 19, 2018

(51) Int. Cl.
*G06Q 30/00* (2012.01)
*G06F 9/54* (2006.01)

(52) U.S. Cl.
CPC .............. *G06Q 30/012* (2013.01); *G06F 9/54* (2013.01)

(58) Field of Classification Search
CPC .......................... G06Q 30/012; G06F 16/2465
USPC ........................................................ 705/302
See application file for complete search history.

(56) References Cited

U.S. PATENT DOCUMENTS

| | | | | |
|---|---|---|---|---|
| 2001/0034609 A1* | 10/2001 | Dovolis | ................. | G06Q 30/02 705/21 |
| 2002/0026395 A1* | 2/2002 | Peterson | ................. | G06Q 30/02 705/35 |
| 2011/0106714 A1* | 5/2011 | Junger | ................. | G06Q 20/203 705/304 |
| 2011/0131135 A1* | 6/2011 | Carlson | ................. | G06Q 10/00 705/44 |
| 2012/0047219 A1* | 2/2012 | Feng | ................. | G06F 16/2465 709/207 |
| 2012/0084216 A1* | 4/2012 | Williamson | ........... | G06Q 10/06 705/302 |
| 2012/0143773 A1 | 6/2012 | Clausen | | |
| 2012/0185544 A1* | 7/2012 | Chang | ................. | G06Q 50/01 709/206 |
| 2012/0239477 A1 | 9/2012 | Cueli et al. | | |
| 2013/0097088 A1* | 4/2013 | Umetani | ................ | G06Q 30/00 705/302 |
| 2013/0198027 A1 | 8/2013 | Anthonyson et al. | | |
| 2014/0100903 A1* | 4/2014 | Yuan | ................. | G06Q 30/0601 705/7.18 |
| 2014/0201088 A1* | 7/2014 | Pothuri | ................ | G06Q 30/012 705/302 |
| 2016/0171611 A1 | 6/2016 | Sheng et al. | | |
| 2016/0196561 A1* | 7/2016 | Iyer | ...................... | G06Q 30/016 705/304 |

(Continued)

FOREIGN PATENT DOCUMENTS

WO    WO-2012100067 A1 *    7/2012    ......... G06F 16/2465

OTHER PUBLICATIONS https://www.usefulfeedback.com/guides/resolving-customer-complaints-across-social-media-traditional-channels/ Author Michael Hill, Jun. 8, 2011. (Year: 2011).*

*Primary Examiner* — Minnah L Seoh
*Assistant Examiner* — Debra L Glennie
(74) *Attorney, Agent, or Firm* — Brown & Michaels, PC; Stephanie Carusillo

(57) ABSTRACT

Determining relevant dates associated with a purchase of a product and allow for those dates to be sent as a reminder to the purchaser in a commerce environment.

14 Claims, 3 Drawing Sheets

(56) References Cited

U.S. PATENT DOCUMENTS

2017/0083921 A1* 3/2017 Espinoza ............ G06Q 30/012

* cited by examiner

NOTIFICATION UPON PRODUCT PURCHASE FOR ASSOCIATED DEADLINES

BACKGROUND

The present invention relates to notifications regarding product purchases, and more specifically to notifications upon product purchase for associated deadlines.

Often times when a product is purchased, there exists a number of "deadlines" that begin as soon as the item is purchased, such as a time period where it is still possible to return, exchange, obtain a warranty, etc. Unfortunately today it is up to the end shopper or user receiving the product to remember this information unless the provider of the product or manufacturer of the product sends reminders, which is typically not the case.

SUMMARY

According to one embodiment of the present invention a method of establishing notifications for a product purchased by a user to account for expiration date deadlines is disclosed. The method comprising the steps of: a computer receiving an indication that the user purchased a product; the computer mining for information with at least one expiration date deadline; and the computer creating at least one electronic reminder for the at least one expiration date deadline for the user.

According to another embodiment of the present invention a computer program product for establishing notifications for a product purchased by a user to account for expiration date deadlines is disclosed. The computer program product comprising: a computer comprising at least one processor, one or more memories, one or more computer readable storage media, the computer program product comprising a computer readable storage medium having program instructions embodied therewith. The program instructions executable by the computer to perform a method comprising: receiving, by the computer, an indication that the user purchased a product; mining, by the computer, for information with at least one expiration date deadline; and creating, by the computer, at least one electronic reminder for the at least one expiration date deadline for the user.

According to another embodiment of the present invention a computer system for establishing notifications for a product purchased by a user to account for expiration date deadlines is disclosed. The computer system comprising a computer comprising at least one processor, one or more memories, one or more computer readable storage media having program instructions executable by the computer to perform the program instructions comprising: receiving, by the computer, an indication that the user purchased a product; mining, by the computer, for information with at least one expiration date deadline; and creating, by the computer, at least one electronic reminder for the at least one expiration date deadline for the user.

DETAILED DESCRIPTION

In an embodiment of the present invention, once a purchase is made, related dates associated with a purchase are determined and reminders regarding these deadlines are established for the user through their calendar.

In the description, the term "product" refers to any service, good, membership, or product, physical in nature or digital which can be purchased by a consumer.

Figure 1:
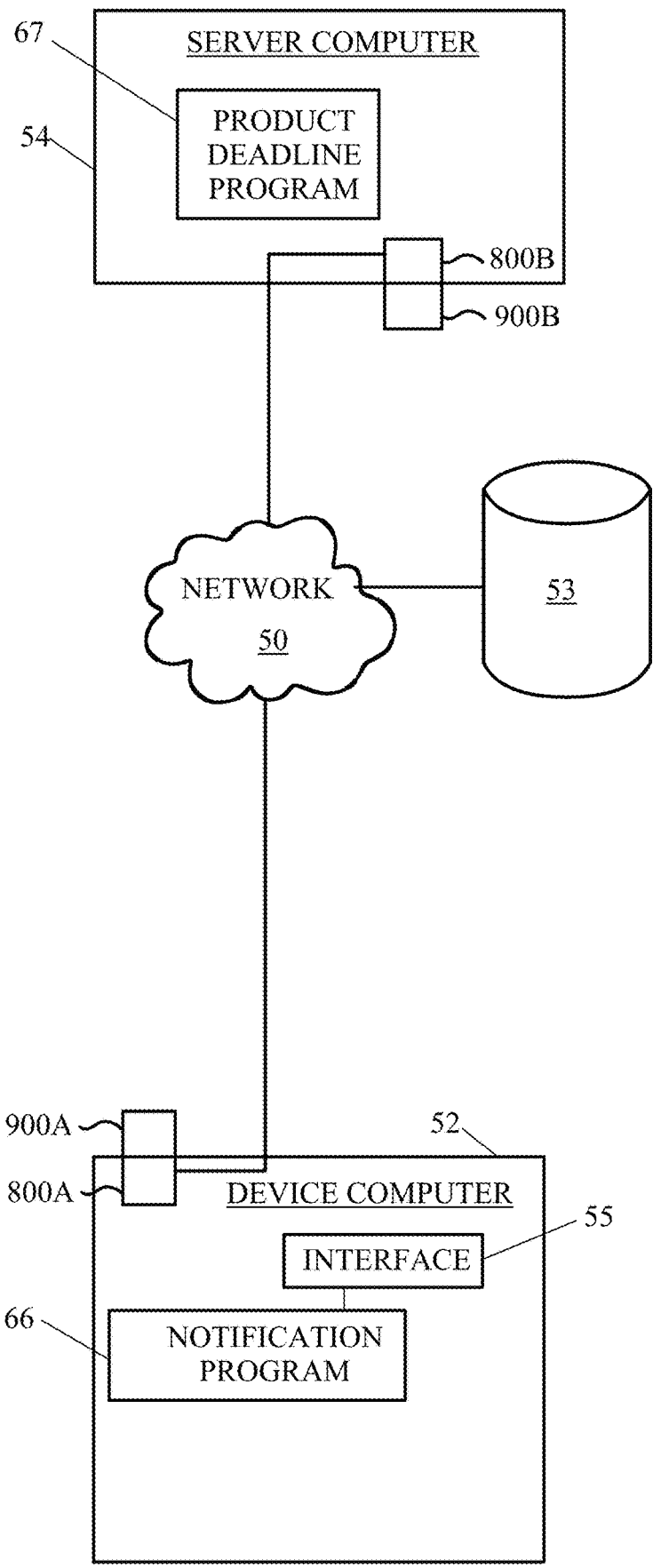
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may be regarding products and purchasing of products. The interface can be, for example, a command line interface, a graphical user interface (GUI), a natural user interface (NUI) or a touch user interface (TUI). The device computer 52 preferably includes a notification program 66. While not shown, it may be desirable to have the notification program 66 be present on the server computer 54. The notification program 66 may establish reminders, calendar appointments, and to do lists for a user which purchased the product. The device computer 52 includes a set of internal components 800a and a set of external components 900a, further illustrated in FIG. 3.

Figure 3:
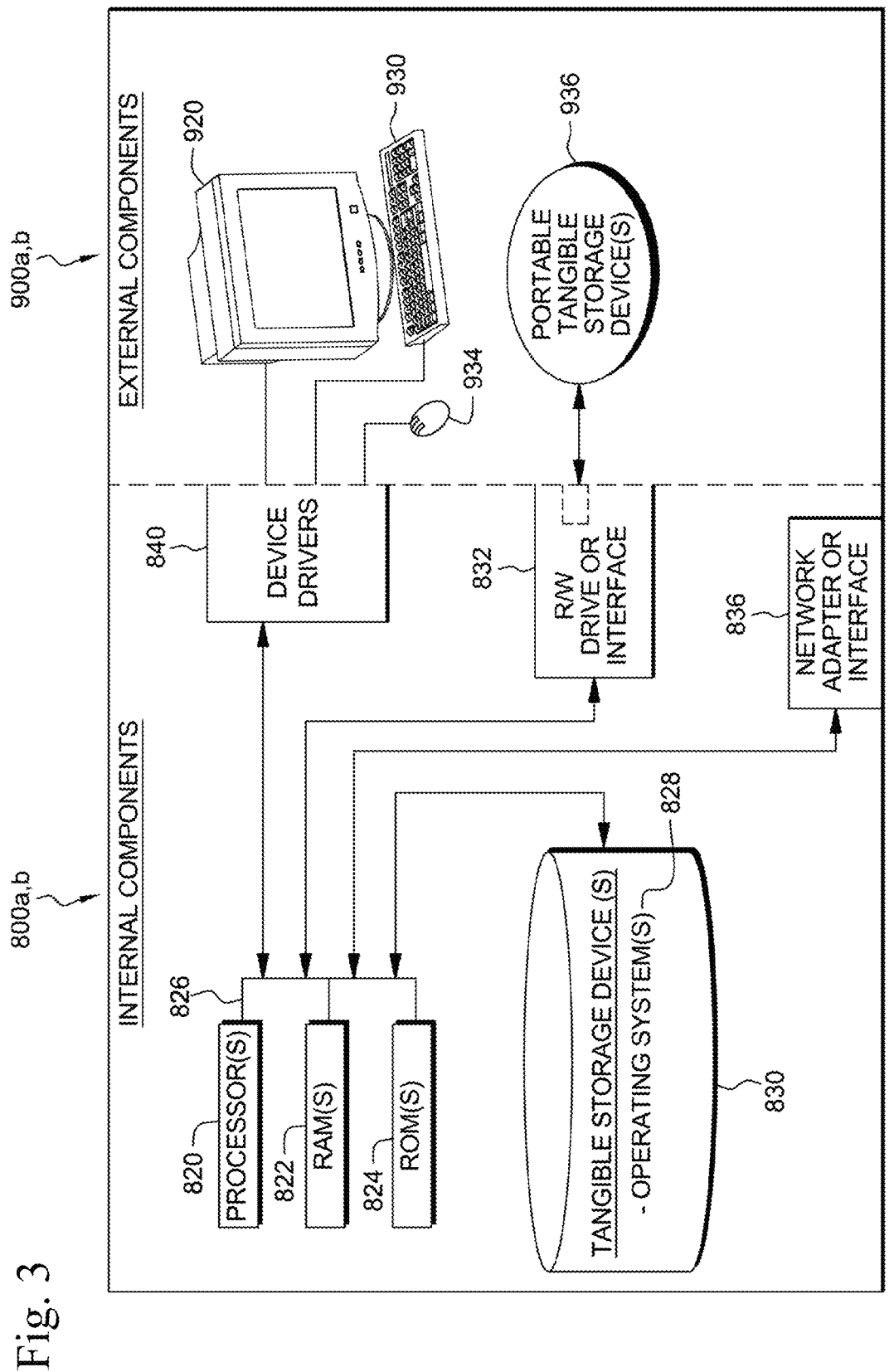
FIG. 3 illustrates internal and external components of a client computer and a server computer in which illustrative embodiments may be implemented.

Server computer 54 includes a set of internal components 800b and a set of external components 900b illustrated in FIG. 3. In the depicted example, server computer 54 provides information, such as boot files, operating system images, and applications to the device computer 52. Server computer 54 can compute the information locally or extract the information from other computers on network 50. The server computer 54 may contain the notification program 66. The server computer preferably contains a product deadline program 67.

Program code and programs such as notification program 66 and product deadline program 67 may be stored on at least one of one or more computer-readable tangible storage devices 830 shown in FIG. 3, on at least one of one or more portable computer-readable tangible storage devices 936 as shown in FIG. 3, or on storage unit 53 connected to network 50, or may be downloaded to a device computer 52 or server computer 54, for use. For example, program code and programs such as notification program 66 and product deadline program 67 may be stored on at least one of one or more storage devices 830 on server computer 54 and downloaded to device computer 52 over network 50 for use. Alternatively, server computer 54 can be a web server, and the program code, and programs such as notification program 66 may be stored on at least one of the one or more storage devices 830 on server computer 54 and accessed device computer 52. In other exemplary embodiments, the program code, and programs such as notification program 66 and product deadline program 67 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

In certain embodiments of the present invention, the notification program 66 and the product deadline program 67 could be an add-on to a commerce website or system, allowing end users the ability to provide reminders for their purchases as part of the product.

The dates obtained by the product deadline program 67 could be passed along to tools such as a marketing cloud allowing marketers the ability to provide upsell opportunities. For example, if a warranty on a refrigerator is coming due, an email reminder might also include offers for related products such as new water filter replacements associated with the refrigerator model purchased.

Figure 2:
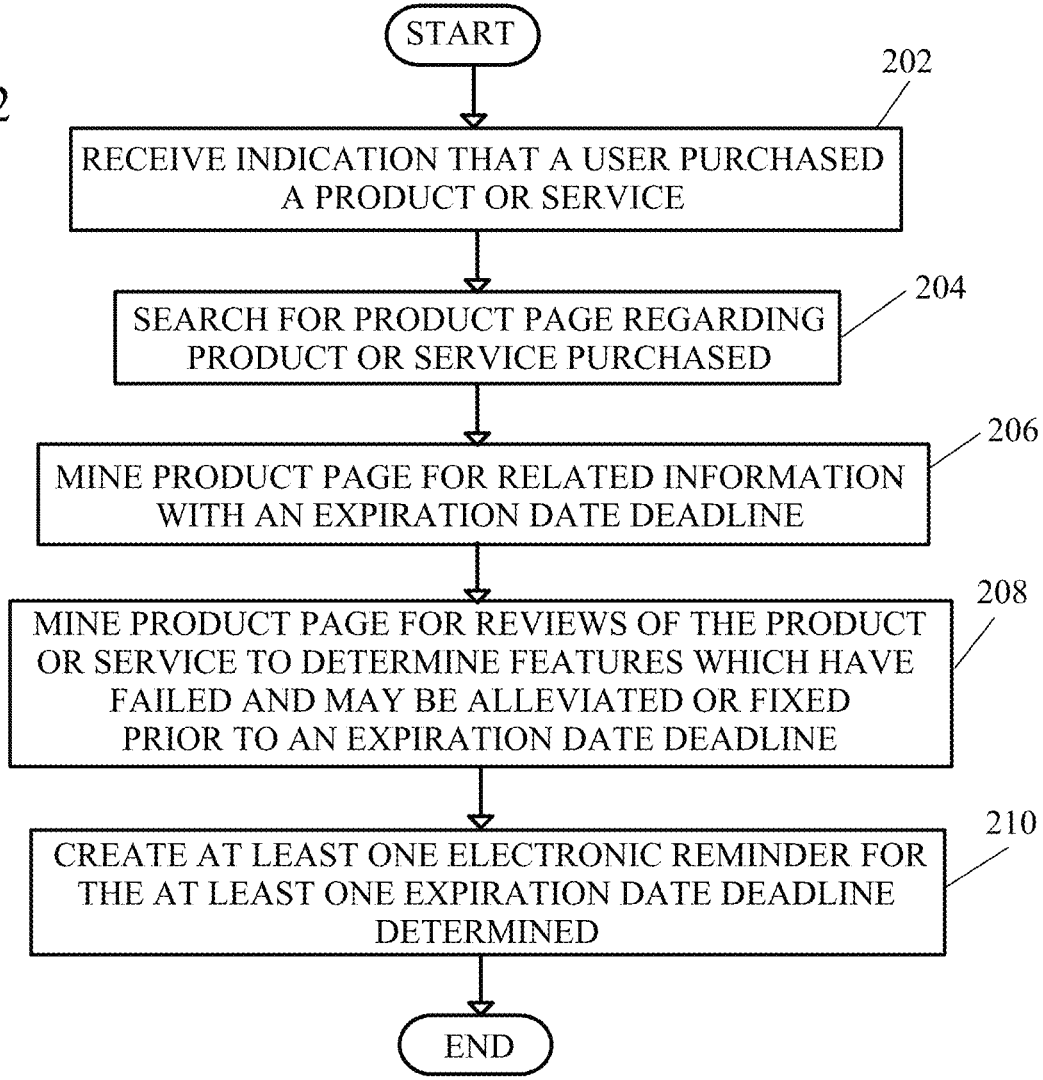
FIG. 2 shows a flow diagram of a method of establishing notifications for products purchased to account for deadlines.

FIG. 2 shows a flow diagram of a method of establishing notifications for products purchased to account for deadlines.

In a first step, the product deadline program 67 receives an indication that a user purchased a product or service (step 202).

The product deadline program 67 searches for and stores a product page regarding the product or service purchased by the user (step 204).

The product deadline program 67 mines the product page for related product information with an expiration date deadline (step 206). The mining may be carried out using many techniques, such as, but not limited to: screen scraping, web scraping, extraction of metadata associated with the page or product; product properties available through application program interfaces (APIs), and digital receipts.

Examples of information that could be mined from the product page is the return policy, the exchange policy, the date in which restocking fees are applicable, warranty information, data in which technical support is applicable to, expiration or promotions received which include accessories related to or for the product purchased and free membership trials.

For example, the product deadline program may have mined the following deadlines regarding a purchase: 1) 90 day return policy from date of purchase for a full refund, 2) 120 day return policy from date of purchase for a full refund minus a 20% restocking fee, and 3) 60 day window from the date of purchase to receive 35% off accessories for the product.

The product deadline program 67 mines the product page for reviews of the product or service for product features which have failed other users which own or use the product or service as they may relate to the expiration date deadline (step 208).

Social media could also be mined for the product or service purchased as users often describe their experiences relative to a product or service. Furthermore, support forums, frequently asked question (FAQ) pages, and search history of a user (i.e. searching for "why is my fitbit not charging") may also be mined for features which have failed other users which own or use the product or service as they may relate to the expiration date deadline.

For example, a specific feature which has failed other users which own the same product can be determined and a reminder can be set for the user to test this specific feature before a warranty expires.

The product deadline program 67 creates at least one electronic reminder for the at least one expiration date deadline determined (step 210) and the method ends. The expiration date is preferably calculated from the purchase date of the product.

The product deadline program 67 sends the at least one electronic reminder for the at least one expiration date deadline determined from the purchase date of the product to the notification program 66 of the device computer 52 of the user. The notification program 66 may be, but is not limited to an electronic calendar, an electronic to-do list or another application tracking deadlines which is maintained and accessed on a device computer 52.

Preferences regarding how the reminders are inputted to remind the user may be set by the user. For example, the user may wish to have a reminder placed in their electronic calendar and added to an electronic to-do list or another application tracking deadlines which is maintained and accessed on a device computer 52.

The number of days prior to the deadline to receive the reminder may also be set either by the product deadline program 67 or by the user. The number of days prior to an expiration date deadline for a user to complete the task may also be calculated by the product deadline program 67 to account for possible travel time, store hours, shipping times for returns, etc. or set by the user.

The notification regarding the reminder may be set by the user and sent as an electronic notification in the form of an e-mail, a message via Short Message Service (SMS), an appointment reminder, or another electronic notification via the device computer of the user.

In certain embodiments, the product deadline program 67 may suggest which specific features of the product need to be tested by which expiration date deadline and tracks which features have already been used and which features of the product purchased have not.

Example—Use Case

A user purchases a new dishwasher from an online merchant on Sep. 1, 2016.

The product page and reviews for the dishwasher have been mined and the product deadline program 67 has determined that the expiration date deadlines for the dishwasher purchased are: 1) 30-day return policy from the date of purchase; 2) 60 days of free technical or mechanical support from the date of purchase; 3) 20 day free subscription to a streaming service from the date of purchase; and 4) 45 day reminder regarding testing a feature of the dishwasher.

Based on the dates mined above, the product deadline program 67 adds new calendar entries to the user's calendar regarding the expiration date deadlines. So, the calendar entries have been added are: 1) Oct. 1, 2016 regarding the return policy; 2) Oct. 31, 2016 regarding the free technical support; 3) Sep. 21, 2016 regarding the free subscription service; and 4) Oct. 16, 2016 for testing features that other users had issues with, such as an extra rinse cycle.

Reminders regarding these dates may be set one to seven days prior to the expiration date deadlines in order to provide the user with enough time to act before the deadlines if necessary.

The reminder regarding the return policy may include information regarding when the product would need to be shipped out or a shipping label requested in order to meet the expiration date deadline for a full refund.

If the notifications regarding the expiration date deadlines are not applicable to the user, the user can disregard or remove the notifications and/or deadlines, for example through the notification program 66 of the device computer.

FIG. 3 illustrates internal and external components of a device computer 52 and server computer 54 in which illustrative embodiments may be implemented. In FIG. 3, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and notification program 66 and a product deadline program 67 are stored on one or more of the computer-readable tangible storage devices 830 for execution by one or more of the processors 820 via one or more of the RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Notification program 66 and product deadline program 67 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Notification program 66 and product deadline program 67 can be downloaded to the device computer 52 and server computer 54 from an external computer via a network (for example, the Internet, a local area network or other, wide area network) and network adapter or interface 836. From the network adapter or interface 836, notification program 66 and product deadline program 67 are loaded into hard drive 830. Notification program 66 and product deadline program 67 can be downloaded to the server computer 54 from an external computer via a network (for example, the Internet, a local area network or other, wide area network) and network adapter or interface 836. From the network adapter or interface 836, notification program 66 and product deadline program 67 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Notification program 66 and product deadline program 67 can be written in various programming languages including low-level, high-level, object-oriented or non object-oriented languages. Alternatively, the functions of a notification program 66 and a product deadline program 67 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of establishing notifications for a product purchased by a user to account for expiration date deadlines comprising the steps of:
   a computer receiving an indication that the user purchased a product;
   the computer mining for information with at least one expiration date deadline;
   the computer mining for social media online content discussing failure of features of the product to determine features of the product which have failed for other purchasers of the user purchased product; and
   the computer creating at least one electronic reminder for the at least one expiration date deadline for the user, wherein at least one expiration date deadline for the user is for testing the determined features of the product which have failed for other users based on the mining of the social media online content.

2. The method of claim 1, wherein the product is a service.

3. The method of claim 1, wherein one of the at least one expiration date deadlines is regarding returning the product purchased.

4. The method of claim 1, wherein the information is mined by an information gathering technique chosen from a group consisting of: screen scraping, web scraping, extraction of metadata associated with a page of the product; and product properties available through an application program interface.

5. The method of claim 1, wherein the at least one electronic reminder for the at least one expiration date deadline is set at least one day prior to the expiration date deadline.

6. A computer program product for establishing notifications for a product purchased by a user to account for expiration date deadlines, a computer comprising at least one processor, one or more memories, one or more computer readable storage media, the computer program product comprising a computer readable storage medium having program instructions embodied therewith, the program instructions executable by the computer to perform a method comprising:
   receiving, by the computer, an indication that the user purchased a product;
   mining, by the computer, for information with at least one expiration date deadline;
   mining, by the computer, for social media online content discussing failure of features of the product to determine features of the product which have failed for other purchasers of the user purchased product; and creating, by the computer, at least one electronic reminder for the at least one expiration date deadline for the user, wherein at least one expiration date deadline for the user is for testing the determined features of the product which have failed for other users based on the mining of the social media online content.

7. The computer program product of claim 6, wherein the product is a service.

8. The computer program product of claim 6, wherein one of the at least one expiration date deadlines is regarding returning the product purchased.

9. A computer system for establishing notifications for a product purchased by a user to account for expiration date deadlines, the computer system comprising a computer comprising at least one processor, one or more memories, one or more computer readable storage media having program instructions executable by the computer to perform the program instructions comprising:

receiving, by the computer, an indication that the user purchased a product;

mining, by the computer, for information with at least one expiration date deadline;

mining, by the computer, for social media online content discussing failure of features of the product to determine features of the product which have failed for other purchasers of the user purchased product; and creating, by the computer, at least one electronic reminder for the at least one expiration date deadline for the user, wherein at least one expiration date deadline for the user is for testing the determined features of the product which have failed for other users based on the mining of the social media online content.

10. The computer system of claim 9, wherein the product is a service.

11. The computer system of claim 9, wherein one of the at least one expiration date deadlines is regarding returning the product purchased.

12. The computer system of claim 9, wherein the information is mined by an information gathering technique chosen from a group consisting of: screen scraping, web scraping, extraction of metadata associated with a page of the product; and product properties available through an application program interface.

13. The computer system of claim 9, wherein the at least one electronic reminder for the at least one expiration date deadline is set at least one day prior to the expiration date deadline.

14. The computer program product of claim 6, wherein the information is mined by an information gathering technique chosen from a group consisting of: screen scraping, web scraping, extraction of metadata associated with a page of the product; and product properties available through an application program interface.

\* \* \* \* \*